United States Patent [19]

Laimer et al.

[11] Patent Number: 4,648,827
[45] Date of Patent: Mar. 10, 1987

[54] SCREW PLASTIFYING AND CONVEYING DEVICE OF AN INJECTION MOLDING MACHINE FOR PLASTICS

[75] Inventors: Friedrich Laimer, Reichenburg; Hermann Neugebauer, Filzbach, both of Switzerland

[73] Assignee: Netsal-Maschinen AG, Switzerland

[21] Appl. No.: 653,877

[22] Filed: Sep. 21, 1984

[30] Foreign Application Priority Data

Sep. 30, 1983 [CH] Switzerland ............... 5324/83

[51] Int. Cl.[4] ............. B29C 45/03; B29C 45/48; B29C 45/50
[52] U.S. Cl. ....................... 425/208; 425/542
[58] Field of Search ............... 425/208, 376 R, 542; 366/88, 89, 323

[56] References Cited

U.S. PATENT DOCUMENTS

| | | | |
|---|---|---|---|
| 3,248,469 | 4/1966 | Kosinsky et al. | 425/208 |
| 3,496,603 | 2/1970 | Listner et al. | 425/208 |
| 3,650,652 | 3/1972 | Dray et al. | 425/208 |
| 3,702,691 | 11/1972 | Fritsch | 366/88 |
| 3,822,057 | 7/1974 | Wheeler | 366/89 |
| 3,827,841 | 8/1974 | Kawai et al. | 425/208 |
| 3,944,192 | 3/1976 | Farrell | 425/208 |
| 4,134,688 | 1/1979 | Horie et al. | 425/208 |
| 4,134,714 | 1/1979 | Driskill | 425/208 |
| 4,192,386 | 12/1978 | Rauwendaal | 425/208 |
| 4,255,379 | 3/1981 | Frankland, Jr. | 425/208 |
| 4,280,802 | 7/1981 | Lang et al. | 425/208 |
| 4,310,484 | 1/1982 | Blakeslee, III | 425/208 |
| 4,329,313 | 5/1982 | Miller et al. | 425/208 |
| 4,347,207 | 8/1982 | Roberts | 425/208 |
| 4,357,291 | 11/1982 | Miller et al. | 425/208 |

FOREIGN PATENT DOCUMENTS

| | | | |
|---|---|---|---|
| 2311946 | 9/1974 | Fed. Rep. of Germany | 425/208 |
| 27657 | 7/1977 | Japan | 425/208 |
| 53543 | 4/1980 | Japan | 425/208 |
| 137940 | 10/1980 | Japan | 425/208 |

Primary Examiner—Barry S. Richman
Assistant Examiner—Joye L. Woodard
Attorney, Agent, or Firm—McGlew and Tuttle

[57] ABSTRACT

A screw plastifying and conveying device includes a screw (5) which has a pull-in zone (I) of constant pitch volume ($V_0$), a first compression zone (II), and adjacent thereto, i.e. in the injection side, a second compression zone (III). The compression ratio ($V_1:V_0$) of the second compression zone (III) is between 1:1.0 and 1.2, while that of the first compression zone is between 1:1.6 and 1:4. This makes it possible, by underdosing, to reduce the melt volume in the second compression zone, thereby achieving stable conveying action over a wide operating range. Molded parts with minimal internal tensions and e.g. also molded parts of glass-clear material with unobjectionable optical properties can thus be produced.

10 Claims, 3 Drawing Figures

SCREW PLASTIFYING AND CONVEYING DEVICE OF AN INJECTION MOLDING MACHINE FOR PLASTICS

FIELD AND BACKGROUND OF THE INVENTION

This invention relates in general to plastifying devices and in particular to a new and useful screw plastifying and conveying device of an injection molding machine for plastics.

The invention relates to a screw plastifying and conveying device of an injection molding machine for plastics in which the plastification and transport of the plastic compound takes place on account of the rotary motion of the screw, and the injection of the plastic compound into the mold cavity takes place on account of the axial motion of the screw or by means of a separate injection cylinder. According to the known state of the art, the plastifying screws are divided into 3 zones, namely the so called feed or pull-in zone which is charged with granulate, therefore have a large pitch volume, the compression zone, in which the pitch volume decreases steadily in order to achieve thereby a compaction of the developing plastic melt, and the measuring or metering zone which has a constant pitch volume and serves the purpose of uniform transport while at the same time taking care of the homogenization of the plastic melt. The pitch volume ratio of the metering zone and pull-in zone is called the compression ratio and must be adapted to the properties of the plastic to be processed. Now, in order to widen the applicability of one and the same screw, dosing devices are known which deliver an adjustable amount of plastic granulate to the pull-in zone of the plastifying screw during its rotation (see e.g. Der. Spritzgiessprozess (The Injection molding Process), VDI-Verlag, Dusseldorf 1979, pages 67 to 89, German OS No. 1801259; German Pat. No. 2029353). The dosing device permits a reduction of the compression ratio below the value given by the screw geometry in that less material is fed to the plastifying screw than it is capable of conveying. Due to this "underdosing", the pull-in zone and a part of the compression zone are filled only partly with material. The compression zone is effective only in the area in which the screw threads are filled completely, wherefrom results the desired variable compression ratio.

But the disadvantage of these known devices is that the supply of shearing heat to the metering zone cannot be influenced because its length is fixed by the screw geometry and because this zone must always be filled completely. The consequence thereof is that, considering the shallow metering zone thread depths required for perfect homogenization of the melt, the heat input through viscous friction becomes too great so that the plastifying cylinder must be cooled in the metering zone area (see e.g. German Pat. No. 2029353, section 8, lines 5 to 15). In addition, practical experiments have shown that the conveying action of the known three-zone plastifying screws becomes unstable from a certain underdosing on, resulting in greatly varying plastification times and melt temperatures. This restricts the applicability of known screws greatly, which means that only a weak underdosing is possible. Nor is it possible to reduce the melt volume in the metering zone by underdosing to adapt thereby the melt dwelling time to the respective material properties, which is necessary especially whenever the material must be plastified near the upper limit of the permissible processing temperature.

This is necessary, for example, when the orientations and internal tensions in the molded part must be minimal or when glass-clear materials must be processed into molded parts having defined, exactly reproducible optical properties.

SUMMARY OF THE INVENTION

The invention provides a screw plastifying and conveying device wherein the screw shows a stable conveying behavior over a wide operating range in the event of underdosing.

The plastic melt is homogenized optimally with respect to temperature and color distribution and exactly the right amount of energy is supplied to plastics of different viscosity and thermal capacity so that no cooling of the plastifying cylinder is required.

The dwelling time of the melt is kept as short as possible at high temperature to prevent thereby the thermal decomposition of the plastic and make processing at high melt temperatures possible. This permits, for example, the production of optical molded parts with extremely low orientations and internal tensions. Other optical characteristics, such as double refraction, light permeability, and index of refraction, also attain a quality level considered unachievable heretofore.

It is another object of the invention to reduce the viscosity of the melt through higher processing temperatures, whereby the injection pressures can be lowered and longer flow paths in the mold can be overcome.

The invention also eliminates entirely, in the screw antechamber the axial temperature differences in the melt, which are always present in known three-zone screws, which again contributes to a quality improvement of the moldings produced.

A prevention of melt temperature variations from shot to shot as occur in conventional screws when underdosing is employed is effected in that the conveying action of the screw remains stable and the plastifying times are constant from shot to shot.

The invention makes possible a change of color or plastic material in a minimum of time and with the least material consumption, which is effected by the small volume of material in the screw.

The invention also makes it possible for the melt temperature to be adjustable over a wide range and to make it possible to process many kinds of plastic with one and the same screw.

According to the invention, these problems are solved in that an additional screw zone is also a compression zone with a pitch volume decreasing in conveying direction. The second compression zone, replacing the metering zone of conventional screws, has expediently a continuously decreasing pitch volume, the pitch volume ratio between the end and the beginning of the second compression zone advantageously being in the range from 1:1.10 to 1:2.0. On the other hand, the compression ratio of the first compression zone is in the range from 1:1.6 to 1:4, as in conventional screws. The pitch volume reduction in the second compression zone can be achieved by the following measures, either snugly or in combination:
  reducing the thread depth,
  reducing the lead,
  increasing the web width.

Depending on the application, a combination of two or all three possibilities can lead to optimum results.

Accordingly, it is an object of the invention to provide a screw plastifying and conveying device of an injection molding machine which includes three zones in the plastifying cylinder including a feed or pull-in zone, an adjacent compression zone and another zone on the injection side which is a compression zone whose pitch volume decreases in the conveying direction.

A further object of the invention is to provide a screw plastifying and conveying device which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
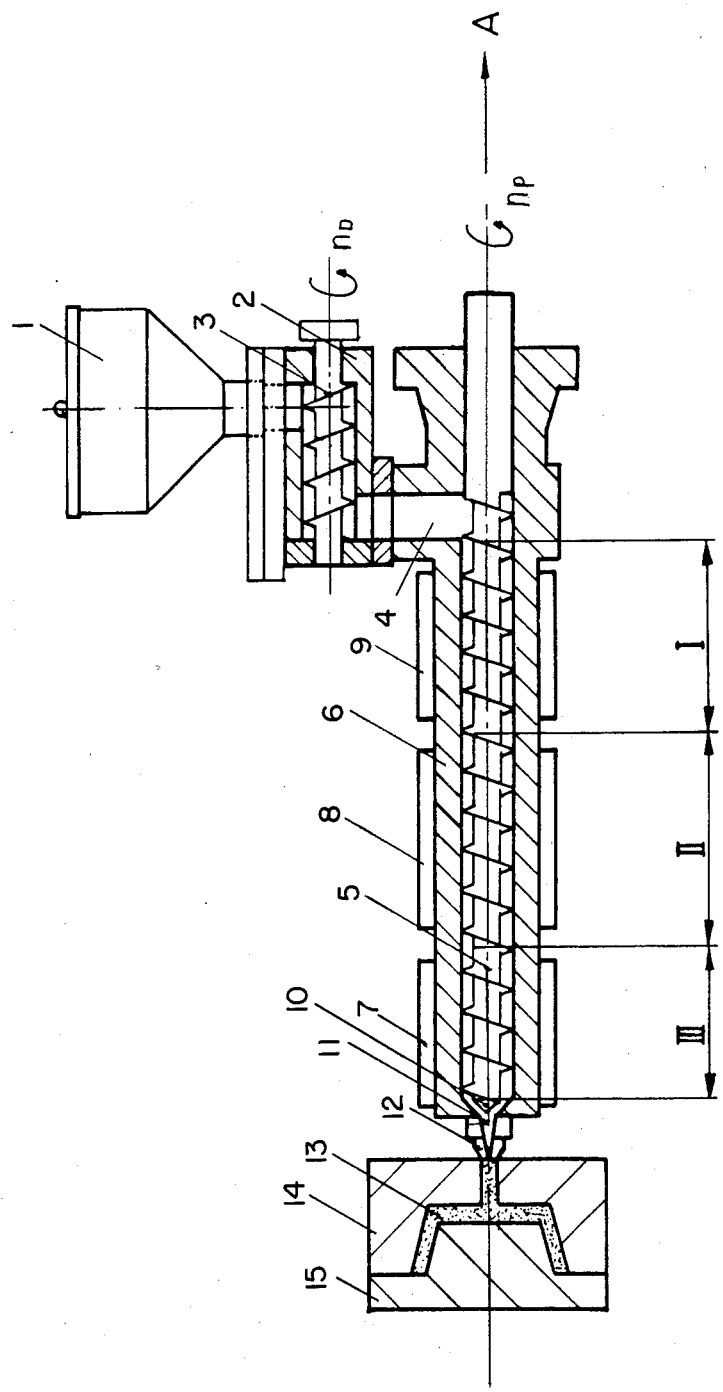
FIG. 1 is an axial sectional view of a screw plastifying and conveying device of an injection molding machine constructed in accordance with the invention.

Referring to the drawings in particular the invention embodied therein comprises a screw plastifying and conveying device of an injection molding machine in which the plastic granulated material is fed into a hopper 1 and the plasticized material is directed into a mold cavity 13 of a two section mold having sections 14 and 15.

FIG. 1 shows an example of a device according to the invention. From a hopper 1, the plastic granulate enters a screw dosing device or means of known design, consisting of a housing 2, cylindrical on the inside, in which the dosing screw 3 is rotatably mounted. The dosing screw is driven e.g. by an electric variable speed motor (not shown), thus making it possible to regulate the conveyed flow of plastic granulate which enters the plastifying cylinder 6 through the filler opening 4 during the plastification process. The plastifying screw 5 is mounted in the plastifying cylinder 6 so as to be rotatable and axially movable by drive means. The plastifying screw 5 is driven by a variable speed electric or hydraulic motor (not shown). Screw 5 has a shank and helical thread on the shank. The plastifying cylinder 6 is equipped with heating bands 7,8,9 which bring the plastifying cylinder to operating temperature in the starting phase and compensate for heat losses to the outside during operation. The plastifying screw 5 has 3 zones, namely the feed or pull-in zone I, the first compression zone II, and the second compression zone III according to the invention. It is optional to equip the screw tip 10 with a known backflow lock, (not shown).

Figure 3:
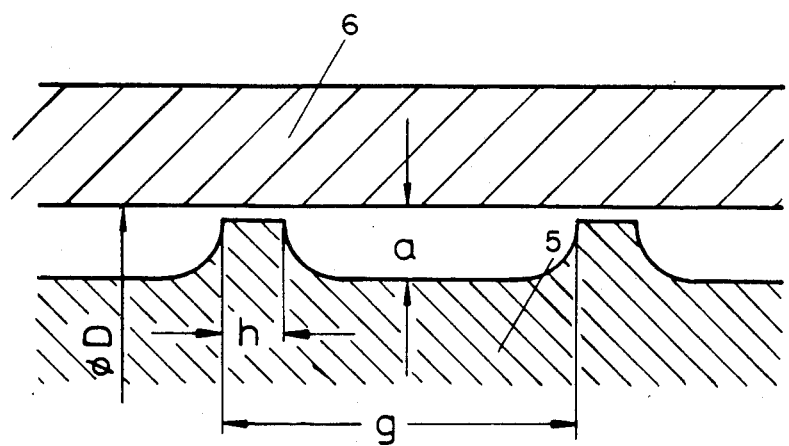
FIG. 3 is an enlarged partial of another portion of the device shown in FIG. 1.

During the plastifying process, the plastifying screw 5, revolves at $n_P$ (symbolizing part of the drive means for the screw 5) and the dosing screw at $n_D:n_p$ governs the filling ratio of the second compression zone III, as explained explicitly in FIG. 3, and hence, the energy supplied to the melt. The quantity conveyed by the plastifying screw and, hence, the plastifying time is fixed in known manner by the speed $n_p$ of the plastifying screw. During the plastifying process, the plastifying screw 5 conveys the melt into the screw antechamber 11, moving in known manner from the front most position shown axially in the direction indicated by the arrow A at the same time. After shifting axially by a specified amount, the rotary motions of the dosing screw 3 and plastifying screw 5 are stopped. A hydraulic cylinder (not shown) now moves the plastifying screw 5 to the front again, opposite to the direction A (which is used to symbolize this part of the drive means), thereby pushing the plastic melt in the screw antechamber 11 through the nozzle 12 into the mold cavity 13 formed by the two mold halves 14 and 15. Instead of the open nozzle 12 shown here, a known shut-off nozzle, such as an hydraulically controlled or spring-loaded one, may also be used. The mentioned adjustable speed ratio $n_D:n_p$ is particularly advantageous as adjustment parameter, but it is also possible to specify the speed $n_D$ of the dosing screw 3 separately or to achieve underdosing by having the dosing screw convey granulate into the plastifying cylinder during a part of the plastifying time only. Finally, the entire dosing device 2,3 may be replaced by other known dosing devices (see e.g. "Der Spritzgiessprozess", VDI-Verlag, Dusseldorf 1969, pages 67 to 85).

Figure 2:
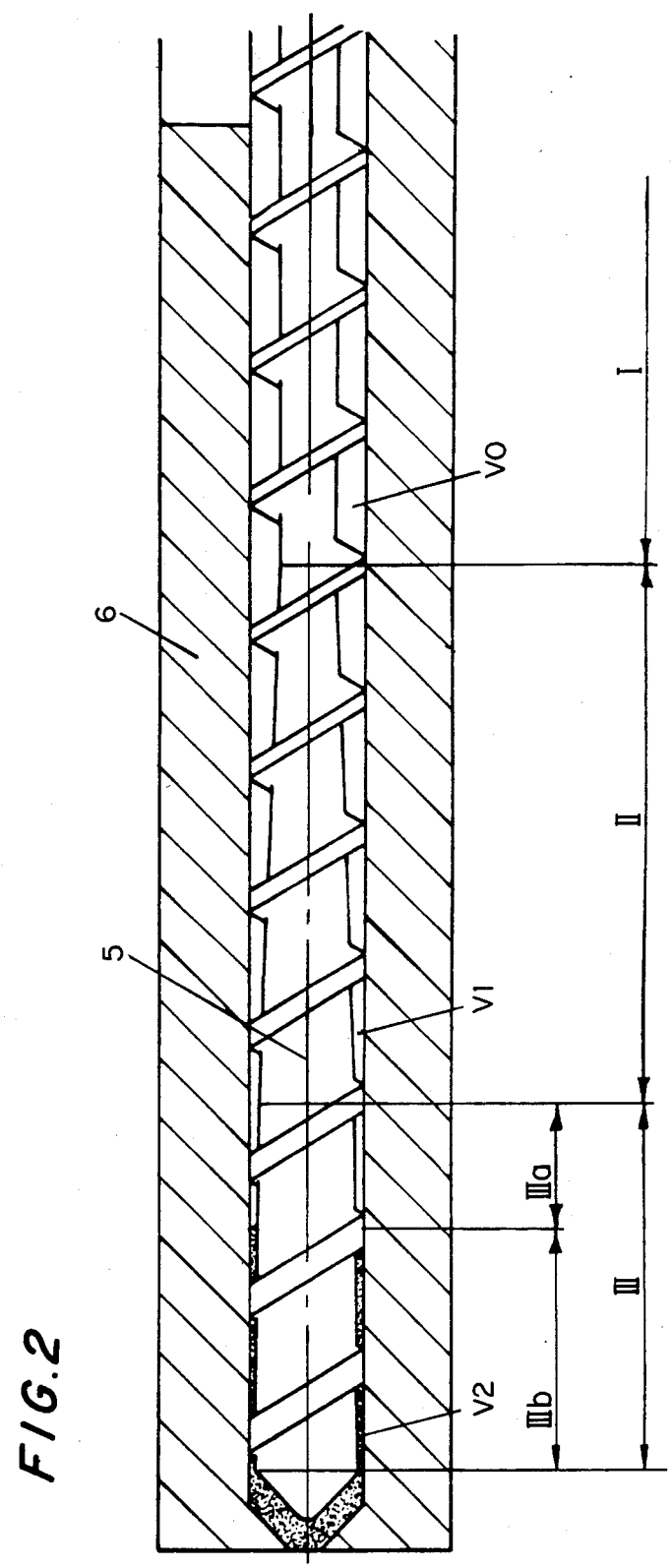
FIG. 2 is an enlarged partial view of the device shown in FIG. 1.

FIG. 2 shows a portion of the device shown in FIG. 1 and explains how the second compression zone III according to the invention functions. It is clear that only the front portion IIIb is completely filled with plastic melt while all other screw threads contain plastic melt or plastic granulate in part only. It is essential that the input of shear energy takes place mainly in the zone IIIb, whereas in zone IIIa, due to being filled less, there is also less shearing of the plastic melt.

The operator can determine the boundary between the zones IIIa and IIIb by means of the output of the dosing device, i.e. by the speed ratio $n_D:n_p$ in FIG. 1. This makes it possible to bring many plastic compounds to the optimal processing temperature with one and the same screw without having to supply or dissipate heat through the wall of the plastifying cylinder 6.

FIG. 3 serves to explain advantageous dimensions of the plastifying screw 5. The pitch volume V of the screw is defined by the following formula:

$$V = \frac{D^2 - (D - 2a)^2}{4} (g - h).$$

In this formula D is the inside diameter of the plastification cylinder 6, a is the gap distance between screw 5 and the cylinder 6 (at a location between the turns of the thread on the screw), g is the pitch or distance between turns of the thread, and h is the width of each turn of the thread. In this way a pitch volume can be determined for any location along the cylinder and screw combination, the pitch volume being a structural characteristic at each location.

if $V_0$ is the pitch volume at the start of the first compression zone II, $V_1$ the pitch volume at the start of the second compression zone III, and $V_2$ the pitch volume at the end of the second compression zone, the following advantageous compression ranges will result:

Compression ratio of the first compression zone II which is also a physical characteristic of the structure) is:

$V_1 : V_0 = 1:1.6$ to $1:4$, e.g. $1:2.5$;

compression ratio of the second compression zone III is:

$V_2 : V_1 = 1:1.10$ to $1:2.0$, preferably $1:1.5$;

length of the second compression zone III is:

2D to 5D, preferably 3.5D;

variation of the web width is:

h=0.06D to 0.3D, preferably increasing from 0.09D to 0.16D; and thread depth of the second compression zone III can be computed by the following law of similarity:

$$a = a_o \frac{(D) \cdot 7}{(D_o)}.$$

For a $D_o = 32$ mm screw, $a_o$ is in the following range:

$a_0 = 0.6$ to $3.0$ mm, advantageously decreasing from 1.5 to 1.0 mm.

While a specific embodiment of the invention has been shown and described in detail to illustrate the application of the principles of the invention, it will be understood that the invention may be embodied otherwise without departing from such principles.

What is claimed is:

1. A screw plastifying and conveying device of an injection molding machine for plastics, comprising a plastifying cylinder having a material inlet and a mold injection outlet spaced away from said inlet in a conveying direction, dosing means connected to said cylinder for supplying material to said inlet, a screw comprising a shank with a helical thread having a plurality of turns on said shank, each turn having a depth by which it extends from said shank, adjacent turns being separated by a web width on said shank, said screw mounted in said plastifying cylinder for rotation and for axial displacement therein, drive means connected to said screw for rotating and for axially displacing said screw, said screw thread defining a feed zone communicating with said inlet, a first compression zone and a second compression zone ending at and communicating directly with said outlet, said first compression zone being between said feed zone and said second compression zone, each of said first and second compression zones having a compression ratio which is a ratio between a pitch volume of the screw at the end and the beginning of each compression zone in the conveying direction, the compression ratio of the second compression zone being greater than the compression ratio of the first compression zone.

2. A device according to claim 1, wherein an axial length of the second compression zone is two to five times the inside diameter of the plastifying cylinder.

3. A device according to claim 1, wherein the compression ratio of the second compression zone is in the range of from 1:1.10 to 1:2.0.

4. A device according to claim 3, wherein the pitch volume of the second compression zone decreases continuously, in the conveying direction.

5. A device according to claim 3 wherein the compression ratio of the first compression zone is in the range of from 1:1.6 to 1:4.

6. A device according to claim 5 wherein the axial length of the second compression zone is two to five times the inside diameter of the plastifying cylinder.

7. A device according to claim 6 wherein the compression ratio of the second compression zone is about 1:1.5, the compression ratio of the first compression zone is about 1:2.5 and the axial length of the second compression zone is about 3.5 times the inside diameter of the plastifying cylinder.

8. A device according to claim 1, wherein the pitch volume of said compression zone decreases continuously.

9. A device according to claim 8, wherein said thread depth of turns of said second compression zone decreases in said conveying direction.

10. A device according to claim 8, wherein said web width between adjacent turns of said second compression zone increases in said conveying direction.

* * * * *

UNITED STATES PATENT OFFICE
CERTIFICATE OF CORRECTION

Patent No. 4,648,827  Dated March 10, 1987

Inventor(s) Laimer et al

It is certified that error appears in the above-identified patent and that said Letters Patent are hereby corrected as shown below:

On the title page Item (73)
The name of the Assignee should be corrected to read as follows:

-- NETSTAL-MASCHINEN AG --

Signed and Sealed this

Twenty-sixth Day of April, 1988

Attest:

DONALD J. QUIGG

Attesting Officer  Commissioner of Patents and Trademarks